(12) United States Patent
Lau et al.

(10) Patent No.: US 10,203,759 B1
(45) Date of Patent: Feb. 12, 2019

(54) GESTURE DETECTION DEVICE HAVING AN ANGLED LIGHT COLLIMATING STRUCTURE

(71) Applicant: Maxim Integrated Products, Inc., San Jose, CA (US)

(72) Inventors: Judy Lau, Palo Alto, CA (US); Christopher F. Edwards, Sunnyvale, CA (US); Richard I. Olsen, Truckee, CA (US)

(73) Assignee: MAXIM INTEGRATED PRODUCTS, INC., San Jose, CA (US)

( * ) Notice: Subject to any disclaimer, the term of this patent is extended or adjusted under 35 U.S.C. 154(b) by 26 days.

(21) Appl. No.: 14/141,661

(22) Filed: Dec. 27, 2013

Related U.S. Application Data

(60) Provisional application No. 61/867,221, filed on Aug. 19, 2013.

(51) Int. Cl.
*G06F 3/01* (2006.01)
*G06F 3/046* (2006.01)

(52) U.S. Cl.
CPC .............. *G06F 3/017* (2013.01); *G06F 3/046* (2013.01)

(58) Field of Classification Search
None
See application file for complete search history.

(56) References Cited

U.S. PATENT DOCUMENTS

| | | | | |
|---|---|---|---|---|
| 2001/0045512 A1* | 11/2001 | Brent | .................... | B65F 1/1638 250/221 |
| 2007/0052684 A1* | 3/2007 | Gruhlke | ................ | G06F 3/0421 345/173 |
| 2007/0124503 A1* | 5/2007 | Ramos | .................... | G06F 3/017 709/248 |
| 2010/0201637 A1* | 8/2010 | Herne | .................... | G06F 3/046 345/173 |
| 2010/0295821 A1* | 11/2010 | Chang | ................... | G06F 3/0421 345/175 |
| 2011/0057129 A1* | 3/2011 | Yao | ........................ | G01S 7/4813 250/552 |
| 2012/0306815 A1* | 12/2012 | Su | .......................... | G06F 3/042 345/175 |

(Continued)

*Primary Examiner* — Jennifer Mehmood
*Assistant Examiner* — Parul H Gupta
(74) *Attorney, Agent, or Firm* — Kevin E. West; Advent, LLP (57) ABSTRACT

A gesture detection device that includes an angled optical lens is disclosed. In one or more implementations, the gesture detection device includes a gesture sensor configured to detect electromagnetic radiation occurring within a limited spectrum of wavelengths and provides one or more signals in response thereto. The gesture detection device also includes an illumination source assembly configured to emit the electromagnetic radiation occurring within the limited spectrum of wavelengths. The illumination source assembly includes an illumination source for emitting the electromagnetic radiation occurring within the limited spectrum of wavelengths and a light collimating structure configured to at least partially collimate the electromagnetic radiation occurring within the limited spectrum of wavelengths. The light collimating structure is oriented at an angle with respect to an axis perpendicular to a surface of the gesture detection device.

17 Claims, 5 Drawing Sheets

(56) References Cited

U.S. PATENT DOCUMENTS

2013/0155237 A1\* 6/2013 Paek ..................... G06F 1/1632
  348/148
2013/0162520 A1\* 6/2013 Kettle .................... G06F 3/017
  345/156
2013/0335225 A1\* 12/2013 Wen .......................... 340/573.1

\* cited by examiner

GESTURE DETECTION DEVICE HAVING AN ANGLED LIGHT COLLIMATING STRUCTURE

CROSS-REFERENCE TO RELATED APPLICATIONS

The present application claims the benefit under 35 U.S.C. § 119(e) of U.S. Provisional Application Ser. No. 61/867,221, filed Aug. 19, 2013, and titled "GESTURE DETECTION DEVICE HAVING AN ANGLED OPTICAL LENS." U.S. Provisional Application Ser. No. 61/867,221 is herein incorporated by reference in its entirety.

BACKGROUND

Electronic devices, such as smart phones, tablet devices, laptop and desk top computers, digital media players, and so forth, increasingly employ light sensors to control the manipulation of a variety of functions provided by the device. For example, light sensors are commonly used by electronic devices to detect ambient lighting conditions in order to control the brightness of the device's display screen and the keyboard. Typical light sensors employ photo sensors, such as photodiodes, phototransistors, or the like, which convert received light into an electrical signal (e.g., a current or voltage, analog or digital).

Light sensing devices are commonly used in gesture or proximity sensing devices. Gesture sensing (e.g., detection) devices enable the detection of physical movement largely parallel to the display surface (e.g., "gestures") without the user actually touching the device within which the gesture sensing device resides. Proximity sensing devices enable the detection of physical movement that is largely perpendicular to the display surface (e.g., proximate to the display surface). The detected movements can be subsequently used as input command for the device. In implementations, the electronic device is programmed to recognize distinct non-contact hand motions, such as left-to-right, right-to-left, up-to-down, down-to-up, in-to-out, out-to-in, and so forth. Gesture and proximity sensing devices have found popular use in handheld electronic devices such as tablet computing devices and smart phones, as well as other portable electronic devices such as laptop computers, video game consoles, and so forth.

SUMMARY

A gesture detection device that includes an angled optical lens is disclosed. In one or more implementations, the gesture detection device includes a gesture sensor configured to detect electromagnetic radiation occurring within a limited spectrum of wavelengths and provide one or more signals in response thereto. The gesture detection device also includes an illumination source assembly configured to emit the electromagnetic radiation occurring within the limited spectrum of wavelengths. The illumination source assembly includes an illumination source for emitting the electromagnetic radiation occurring within the limited spectrum of wavelengths and a light collimating structure configured to at least partially collimate the electromagnetic radiation occurring within the limited spectrum of wavelengths. The light collimating structure is oriented at an angle with respect to an axis perpendicular to a surface of the gesture detection device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. The use of the same reference numbers in different instances in the description and the figures may indicate similar or identical items.

DETAILED DESCRIPTION

Overview

Gesture or proximity sensing devices typically include gesture (e.g., light) sensing devices to allow for detection of physical movement in proximity to the devices. These light sensing devices are configured to detect light (e.g., electromagnetic radiation) that is generated from an illumination source and reflected from an object, such as a finger or a hand, in proximity to the sensor. Typical gesture sensing devices employ illumination sources that emit electromagnetic radiation, or light, directly above the illumination source, which causes the greatest light intensity to be located directly above the illumination source. However, users typically attempt to perform gestures over a display of the electronic device. These gestures may not be detected by a gesture sensor due to the object performing the gesture being positioned outside the greatest light intensity.

Accordingly, a gesture detection device that includes an angled optical lens is disclosed. In one or more implementations, the gesture detection device includes a gesture sensor configured to detect electromagnetic radiation occurring within a limited spectrum of wavelengths and provide one or more signals in response thereto. In a specific implementation, the gesture sensor comprises one or more photo sensors. For example, the gesture sensor may comprise an array of photo sensors arranged in a segmented configuration. The gesture detection device also includes an illumination source assembly configured to emit the electromagnetic radiation occurring within the limited spectrum of wavelengths. In some implementations, the illumination source comprises one or more light emitting diodes. The illumination source assembly includes an illumination source for emitting the electromagnetic radiation occurring within the limited spectrum of wavelengths and an optical lens structure configured to at least partially collimate the electromagnetic radiation occurring within the limited spectrum of wavelengths. The optical lens structure is oriented at an angle with respect to an axis perpendicular to a surface of the gesture detection device. In a specific implementation, the angle ranges from about twenty degrees (20°) to about twenty-five degrees (25°).

Example Implementations

Reference will now be made in detail to the embodiments of the present disclosure, examples of which are illustrated in the accompanying drawings.

Figure 1:
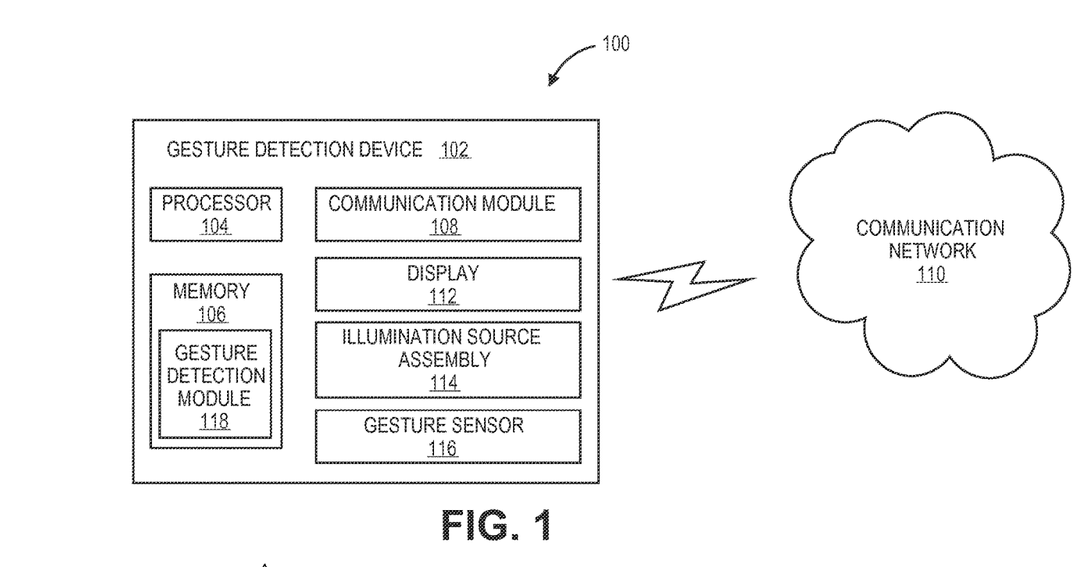
FIG. 1 is a block diagram illustrating an electronic device having gesture detection functionality in accordance with an example implementation of the present disclosure.

FIG. 1 is an illustration of a system that includes an electronic device 102 having gesture detection capabilities in an example implementation. In one or more implementations, the electronic device 102 comprises a smartphone device, a tablet computing device, or the like. The electronic device 102 includes a processor 104 and a memory 106. The processor 104 provides processing functionality for the electronic device 102 and may include any number of processors, micro-controllers, or other processing systems and resident or external memory for storing data and other information accessed or generated by the device 102. The processor 104 may execute one or more software programs (e.g., modules) that implement techniques described herein.

The memory 106 is an example of tangible computer-readable media that provides storage functionality to store various data associated with the operation of the electronic device 102, such as the software program and code segments mentioned above, or other data to instruct the processor 104 and other elements of the electronic device 102 to perform the steps described herein. Although a single memory 106 is shown, a wide variety of types and combinations of memory may be employed. The memory 106 may be integral with the processor 104, stand-alone memory, or a combination of both. The memory may include, for example, removable and non-removable memory elements such as RAM, ROM, Flash (e.g., SD Card, mini-SD card, micro-SD Card), magnetic, optical, USB memory devices, and so forth. In embodiments of the device 102, the memory 106 may include removable ICC (Integrated Circuit Card) memory such as provided by SIM (Subscriber Identity Module) cards, USIM (Universal Subscriber Identity Module) cards, UICC (Universal Integrated Circuit Cards), and so on.

The electronic device 102 also includes a communication module 108 for furnishing communicative functionality to the device 102. The communication module 112 may be representative of a variety of communication components and functionality, including, but not limited to: one or more antennas; a browser; a transmitter and/or receiver; a wireless radio; data ports; software interfaces and drivers; networking interfaces; data processing components; and so forth. For example, the communication module 108 may represent radio frequency (RF) circuitry configured to receive and/or transmit electromagnetic signals. The RF circuitry is also configured to convert electrical signals to/from electromagnetic signals and communicates with a communication network 110 and other communications devices via the electromagnetic signals. RF circuitry may include, but is not limited to: an antenna system, an RF transceiver, one or more amplifiers, a tuner, one or more oscillators, a digital signal processor, a CODEC chipset, a subscriber identity module (SIM) card, memory, and so forth.

The communication module 108 facilitates communication with other devices (e.g., electronic mobile devices, web servers, web clients, desktop computers, laptop computers, etc.) through a communication network 110, external ports (e.g., Universal Serial Bus (USB), a FIREWIRE communication interface, etc.) included in the electronic device 102, or the like. The external ports are adapted for communicatively coupling the device 102 directly to other devices or indirectly over the communication network. In some embodiments, the external port is a multi-pin connector, or the like.

The communication network 110 may comprise a variety of different types of networks and connections that are contemplated, including, but not limited to: the Internet; an intranet; a satellite network; a cellular network; a mobile data network; wired and/or wireless connections; and so forth.

Wireless networks may comprise any of a plurality of communications standards, protocols and technologies, including but not limited to: Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11 g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS), and/or Short Message Service (SMS), or any other suitable communication protocol.

As shown in FIG. 1, the electronic device 102 also includes a display 112 that displays visual output to a user. The visual output may include graphics, text, icons, video, and any combination thereof (collectively termed "graphics"). In some implementations, the display 112 may comprise a liquid crystal display, an organic light emitting diode display, or the like.

The electronic device 102 also includes an illumination source assembly 114 configured to emit electromagnetic radiation occurring in a limited spectrum of wavelengths. For example, the illumination source assembly 114 may emit electromagnetic radiation occurring in the non-visible light spectrum (e.g., infrared spectrum, radio frequency spectrum, etc.) or emit electromagnetic radiation occurring in the visible light spectrum.

Figure 3A:
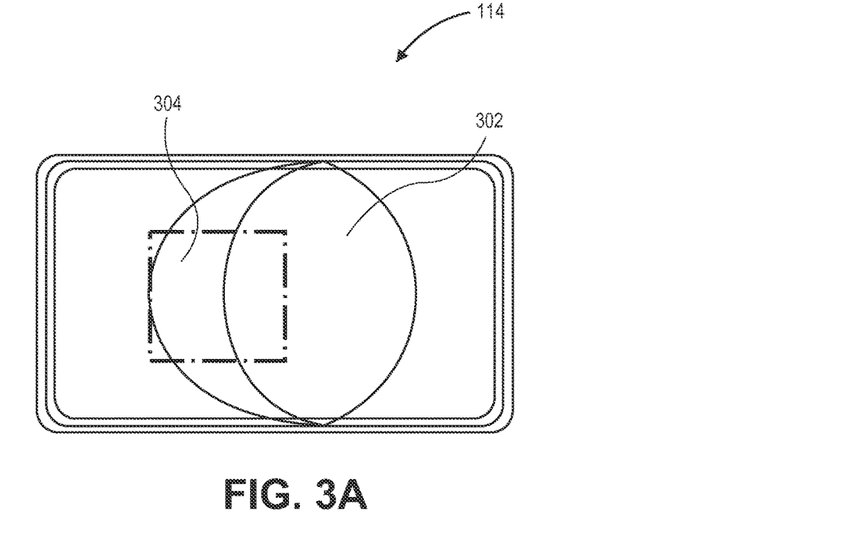
FIG. 3A is a diagrammatic plan view illustrating an illumination source assembly in accordance with an example implementation of the present disclosure.
Figure 3B:
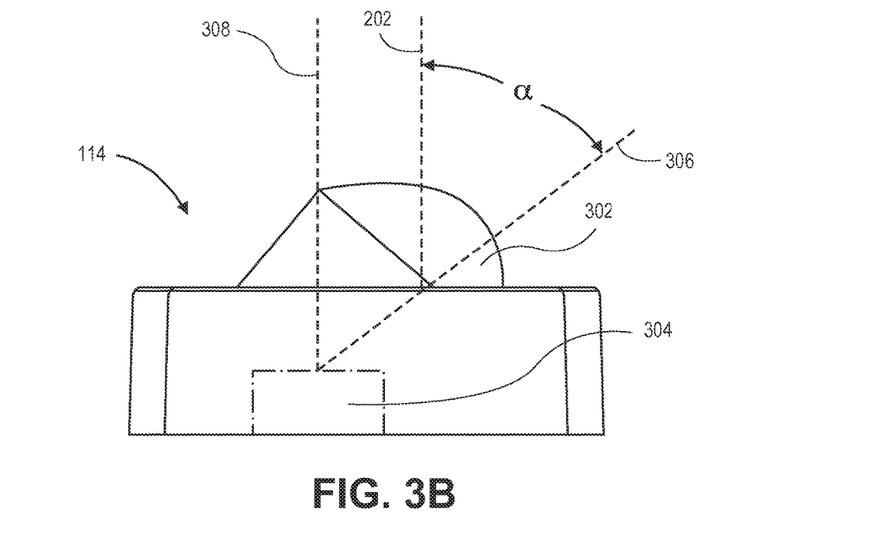
FIG. 3B is a diagrammatic cross-sectional view illustrating the illumination source assembly shown in FIG. 3A in accordance with an example implementation of the present disclosure.

The electronic device 102, as illustrated in FIG. 1, includes a gesture sensor 116. In one or more implementations, the gesture sensor 116 comprises a photo sensor device (e.g., photodetector) configured to detect electromagnetic radiation occurring within a limited spectrum of wavelengths (e.g., infrared light, visible light, etc.). In some embodiments, the gesture sensor 116 comprises a segmented photo sensor (e.g., an array of photo sensors) configured to sense the electromagnetic radiation emitted by the illumination source assembly 114 (e.g., detects reflected light emitted by the illumination source). Each segment of the photo sensor device may be isolated from one another. The segmented photo sensor can be either a single detector functionally partitioned into multiple segments or an array of individual photo sensors. For example, a quad segmented photo sensor is functionally equivalent to four (4) individual photo sensors arranged in a quad layout. As shown in FIGS. 3A and 3B, the illumination source assembly 114 is positioned proximate to the gesture sensor 116. When a moving target passes proximate to the illumination source assembly 114 and the gesture sensor 116, electromagnetic radiation emitted from the illumination source assembly 114 is reflected off the moving target to the gesture sensor 116. The device 110 may also include a light modifying structure to focus (e.g., collimate) reflected electromagnetic radiation onto the gesture sensor 116. For example, the focusing lens focuses reflected light from a moving target, such as a hand gesture, in the space above the gesture sensor 116. The gesture sensor 116 is configured to detect gestures, such as user's movements of his/her fingers and hands. The gesture sensor 116 can also distinguish that the gesture corresponds to a pre-determined gesture (e.g., a recognized gesture). For example, the gesture sensor 116 may detect that the user made a chopping gesture that contacts the user's opposite palm and distinguish that this is a pre-established gesture.

As shown in FIG. 1, the device 102 includes a gesture detection module 118, which is storable in the memory 106 and executable by the processor 104. In one or more implementations, the gesture sensor 116 is connected to the processor 104 and furnishes time dependent signals to the processor 104. The time dependent signals represent the detected electromagnetic radiation, or light, that was reflected from an object proximate to the sensor 116. The gesture detection module 118 is configured to instruct the processor 104 to determine a directional movement of the object (e.g., detect a gesture) proximate to the device 102 based upon the time dependent signals. Example gesture detection techniques are described in U.S. patent application Ser. No. 13/304,603, filed Nov. 25, 2011, and entitled "Optical Sensor Using a Single Illumination Source," which is incorporated by reference in its entirety.

FIGS. 3A and 3B illustrate an example illustration source assembly 114 in accordance with an example implementation of the present disclosure. The illumination source assembly 114 includes a light collimating structure, such as an optical lens structure 302 to focus and to transmit light incident thereon (e.g., light incident upon the lens structure 302 from multiple angles). For example, the optical lens structure 302 may be configured to collimate the light incident on the optical lens structure 302. In one or more implementations, the optical lens structure 302 may be a glass lens, a plastic lens, a spherical lens, an aspherical lens, a Fresnel-type lens, or the like. The illumination source assembly 114 also includes an illumination source 304. In some implementations, the illumination source 304 may comprise one or more light emitting diodes, one or more laser diodes, or the like, that are configured to emit within electromagnetic radiation occurring within the limited spectrum of wavelengths. In other implementations, the light collimating structure may comprise a mirror structure, a glass refraction structure, or a beam steering structure.

Figure 2:
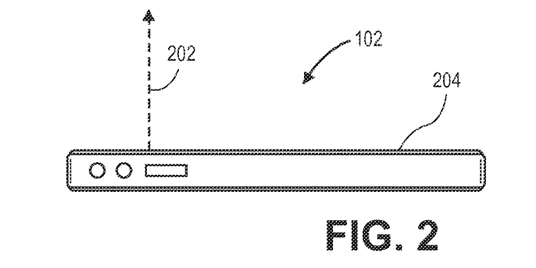
FIG. 2 is a diagrammatic side view illustrating the electronic device shown in FIG. 1 in accordance with an example implementation of the present disclosure.
Figure 4:
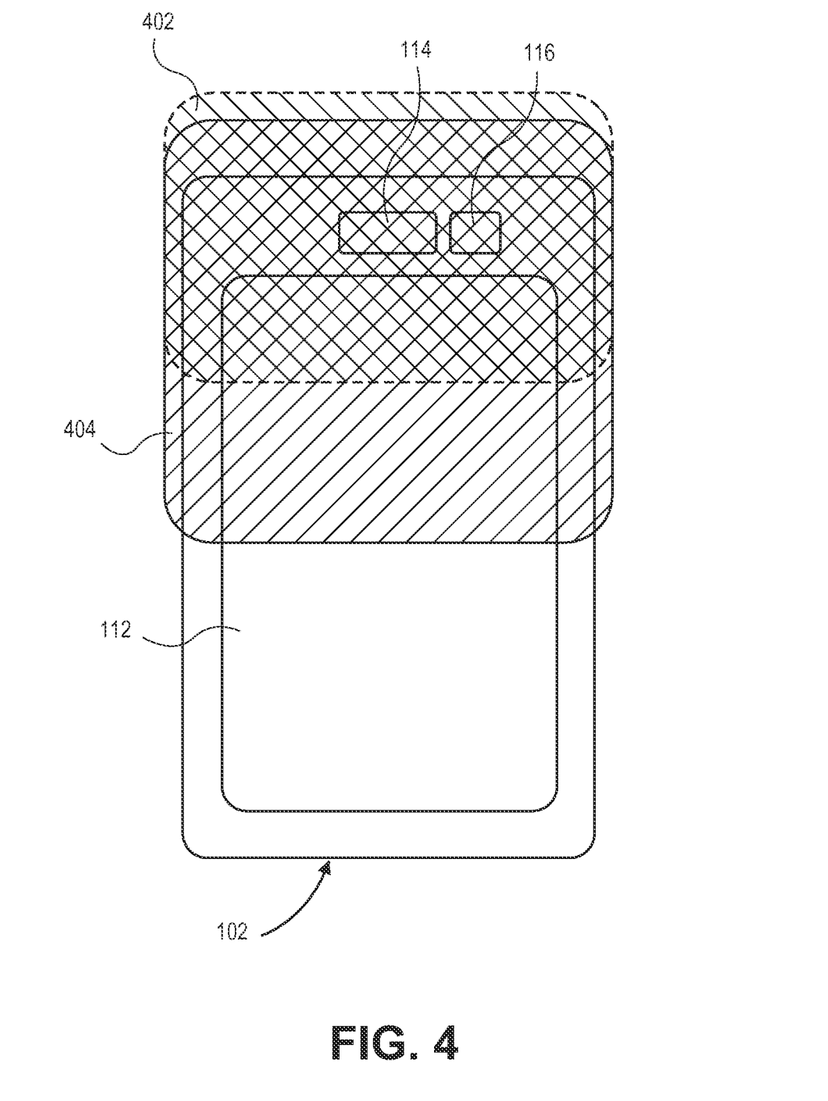
FIG. 4 is a diagrammatic illustrating a plan view of an electronic device, where a first area over the electronic device represents a gesture detection area associated with a typical electronic device and a second area over the electronic device represents a gesture detection area associated with an electronic device in accordance with an example implementation of the present disclosure.

As shown in FIG. 3B, the optical lens structure 302 is oriented at an angle α (e.g., angle axis 306) with respect to an axis 202 that is defined perpendicular to the front surface 204 of the device 102. FIG. 3B also illustrates a focal point axis 308 to define an approximate focal point of the illumination source 304. In an implementation, the angle α may range between zero degrees (0°) and about thirty-five degrees (35°). In a specific implementation, the optical lens structure 302 is oriented at an angle of about twenty degrees (20°) with respect to the axis 202. For example, the angle α can range from about 0°, 1°, 2°, 3°, 4°, 5°, 6°, 7°, 8°, 9°, 10°, 11°, 12°, 13°, 14°, 15°, 16°, 17°, 18°, 19°, 20°, 21°, 22°, 23°, 24°, 25°, 26°, 27°, 28°, 29°, 30°, 31°, 32°, 33°, 34°, 35° to about 0°, 1°, 2°, 3°, 4°, 5°, 6°, 7°, 8°, 9°, 10°, 11°, 12°, 13°, 14°, 15°, 16°, 17°, 18°, 19°, 20°, 21°, 22°, 23°, 24°, 25°, 26°, 27°, 28°, 29°, 30°, 31°, 32°, 33°, 34°, 35°. The orientation of the optical lens structure 302 may allow the gesture sensor 116 to detect electromagnetic radiation reflected from an object positioned over the display 112. For example, the orientation of the optical lens structure 302 may collimate light furnished by the illumination source 304 such that a greater intensity of light is furnished at least partially over the display 112 (see FIG. 4) as compared to typical electronic devices, as discussed herein. Thus, gestures performed by the object may be detected over a greater portion of the device 102 as compared to gesture detection devices where the illumination source emits electromagnetic radiation directly above the device (e.g., maximum intensity of electromagnetic radiation is directly above the sensor). FIG. 4 illustrates areas 402, 404 representing gesture detection areas (e.g., areas where gesture sensor can detect light reflected from an object) over the device 102. For example, area 402 represents a detection area associated with a device having a light emitting diode emitting light at a zero degree (0°) angle with respect to a perpendicular axis defined by a surface of a device. Area 404 represents a detection area associated with the device 102 having an optical lens structure 302 oriented at a twenty degree (20°) angle with respect to a perpendicular axis 202.

Figure 5A:
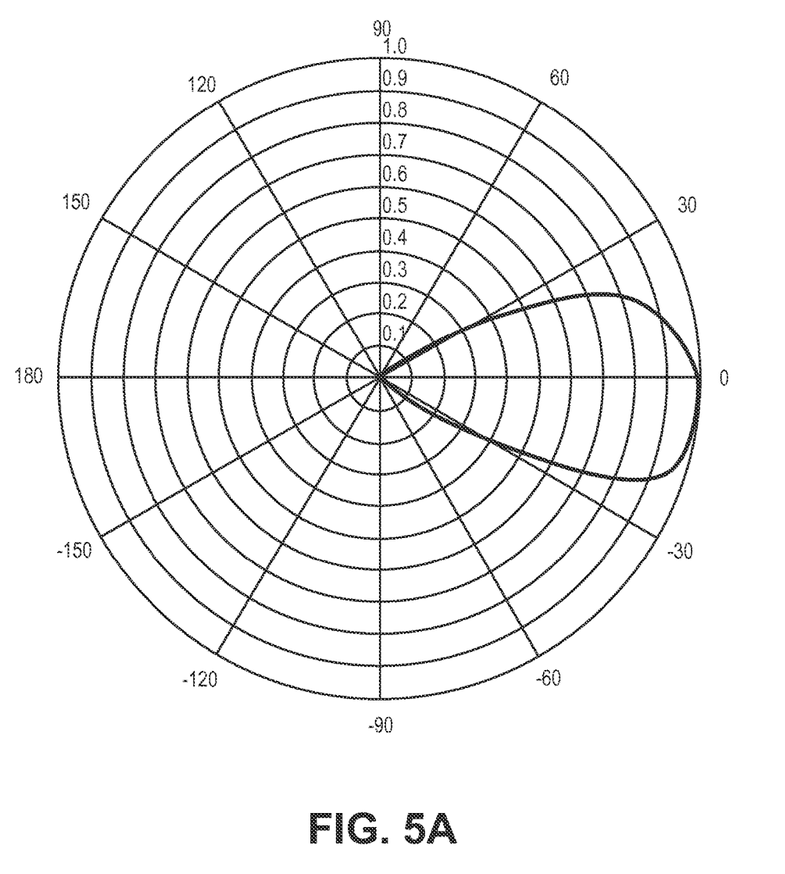
FIG. 5A is a radiation intensity graph illustrating radiation intensity (e.g., light intensity) associated with a typical electronic device.
Figure 5B:
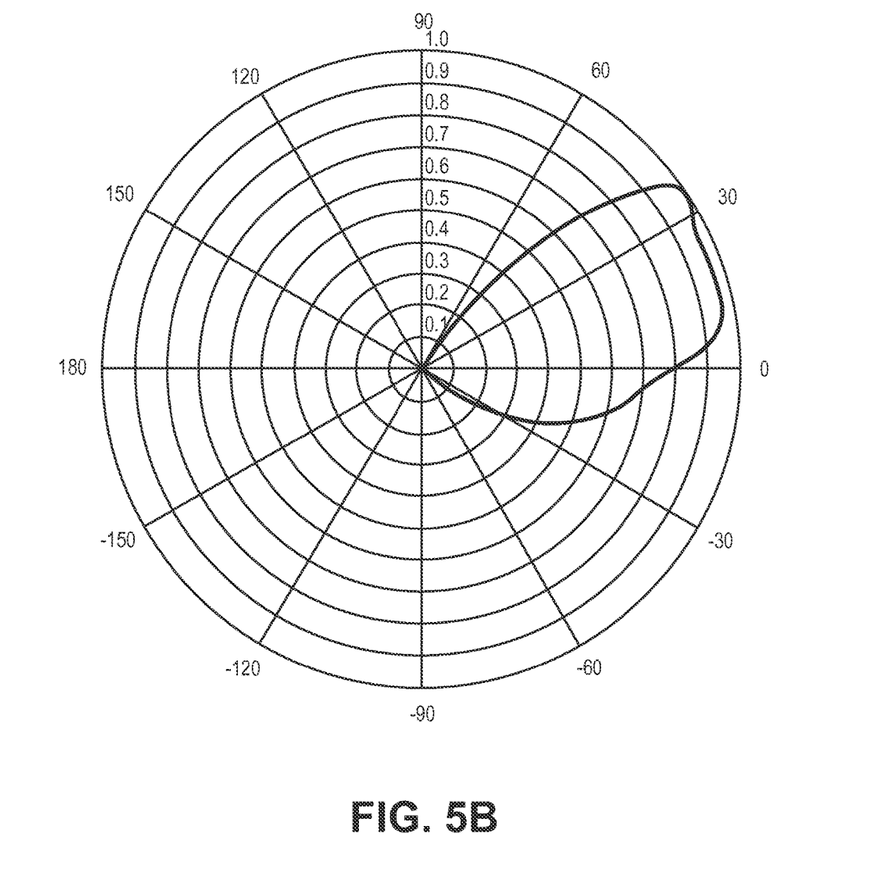
FIG. 5B is a radiation intensity graph illustrating radiation intensity (e.g., light intensity) associated with an electronic device in accordance with an example implementation of the present disclosure.

FIGS. 5A and 5B illustrate graphs representing radiation intensity of received light (e.g., reflected light) based upon the orientation of the emitted light. More specifically, FIG. 5A illustrates a graph representing radiation intensity of received light based upon light being emitted at a zero degree (0°) angle with respect to a perpendicular axis defined by the surface of a device. FIG. 5B illustrates a graph representing radiation intensity of received light based upon light being emitted at a twenty degree (20°) angle with respect to the perpendicular axis 202 due to the configuration of the optical lens structure 302.

Generally, any of the functions described herein can be implemented using software, firmware, hardware or a combination thereof. The terms "module" or "functionality" generally represent software, firmware, hardware, or a combination thereof. In the case of a software implementation, the module, functionality, or logic represents program code that performs specified tasks when executed on a processor (e.g., a CPU). The program code can be stored in memory or on computer readable memory devices (e.g., tangible media, such as non-transitory memory), and so on. The structures, functions, approaches, and techniques described herein may be implemented on a variety of commercial computing platforms having a variety of processors.

Conclusion

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:
1. A gesture detection device for an electronic device including a display, the gesture detection device comprising:
a gesture sensor configured to be positioned adjacent to the display, the gesture sensor being configured to detect electromagnetic radiation occurring within a limited spectrum of wavelengths and to generate at least one signal in response thereto; and an illumination source assembly disposed proximate to the gesture sensor, the illumination source assembly including comprising:

an illumination source disposed adjacent a first side of the display and configured to emit the electromagnetic radiation occurring within the limited spectrum of wavelengths in a first direction towards the display, the first direction being generally parallel to an axis perpendicular to a surface of the display, and a light collimating structure disposed adjacent a second side of the display and oriented at an acute angle with respect to the axis perpendicular to the surface of the display, the light collimating structure being configured to receive and at least partially collimate the emitted electromagnetic radiation occurring within the limited spectrum of wavelengths in a second direction, the second direction being different from the first direction and associated with the orientation of the light collimating structure at the acute angle, wherein emission of the collimated electromagnetic radiation in the second direction provides gesture detection coverage of a relatively larger area associated with the display than emission of the electromagnetic radiation of in the first direction.

2. The gesture detection device as recited in claim 1, further comprising a memory configured to store one or more modules; and a processor coupled to the memory and to the gesture sensor, the processor configured to execute the one or more modules to: analyze the at least one signal; and determine a directional movement of a target based upon the at least one signal.

3. The gesture detection device as recited in claim 1, wherein the at least one signal comprises at least one time dependent signal.

4. The gesture detection device as recited in claim 1, wherein the electromagnetic radiation occurring within the limited spectrum of wavelengths comprises infrared light.

5. The gesture detection device as recited in claim 1, wherein the electromagnetic radiation occurring within the limited spectrum of wavelengths comprises visible light.

6. The gesture detection device as recited in claim 1, further comprising a light modifying structure disposed over the gesture sensor.

7. The gesture detection device as recited in claim 6, wherein the light modifying structure comprises an optical lens configured to collimate electromagnetic radiation occurring within the limited spectrum of wavelengths reflected from a target proximate to the gesture sensor, the collimated electromagnetic radiation occurring within the limited spectrum of wavelengths furnished to the gesture sensor.

8. The gesture detection device as recited in claim 1, wherein the gesture sensor comprises an array of photo sensors.

9. The gesture detection device as recited in claim 1, wherein the illumination source comprises a light emitting diode.

10. An electronic device comprising:
a housing having a front surface including a display disposed therein;

a gesture sensor disposed within the housing adjacent the front surface and configured to detect electromagnetic radiation occurring within a limited spectrum of wavelengths and to generate at least one signal in response thereto;

an illumination source assembly disposed within the housing proximate to the gesture-sensor, the illumination source assembly comprising:

an illumination source disposed adjacent a first side of the display and configured to emit the electromagnetic radiation occurring within the limited spectrum of wavelengths in a first direction toward a surface of the display, the first direction being generally parallel to an axis perpendicular to the surface of the display, and an optical lens structure disposed adjacent a second side of the display and oriented at an acute angle with respect to the axis perpendicular to the surface of the display, the optical lens structure being configured to receive and at least partially collimate the emitted electromagnetic radiation occurring within the limited spectrum of wavelengths in a second direction, the second direction being different than the first direction and associated with the orientation of the optical lens structure at the acute angle, wherein emission of the collimated electromagnetic radiation in the second direction provides gesture detection coverage of a relatively larger area associated with the display than emission of the electromagnetic radiation of in the first direction;

a memory configured to store one or more modules; and a processor coupled to the memory and to the gesture sensor, the processor configured to execute the one or more modules to: analyze the at least one signal; and determine a directional movement of a target based upon the at least one signal.

11. The electronic device as recited in claim 10, wherein the at least one signal comprises at least one time dependent signal.

12. The electronic device as recited in claim 10, wherein the electromagnetic radiation occurring within the limited spectrum of wavelengths comprises infrared light.

13. The electronic device as recited in claim 10, wherein the electromagnetic radiation occurring within the limited spectrum of wavelengths comprises visible light.

14. The electronic device as recited in claim 10, further comprising a light modifying structure disposed over the sensor.

15. The electronic device as recited in claim 13, wherein the light modifying structure comprises an optical lens configured to collimate electromagnetic radiation occurring within the limited spectrum of wavelengths reflected from a target proximate to the sensor, the collimated electromagnetic radiation occurring within the limited spectrum of wavelengths furnished to the gesture sensor.

16. The electronic device as recited in claim 10, wherein the sensor comprises an array of photo sensors.

17. The electronic device as recited in claim 10, wherein the illumination source comprises a light emitting diode.

* * * * *